United States Patent
Oberle et al.

(10) Patent No.: US 6,374,629 B1
(45) Date of Patent: Apr. 23, 2002

(54) LUBRICANT REFRIGERANT COMPOSITION FOR HYDROFLUOROCARBON (HFC) REFRIGERANTS

(75) Inventors: Jill Ellen Oberle, Brant; Thomas Edward Rajewski, Bay City, both of MI (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/236,707

(22) Filed: Jan. 25, 1999

(51) Int. Cl.[7] .................................................. F25B 43/02
(52) U.S. Cl. ..................... 62/473; 62/471; 62/502; 62/192; 252/68
(58) Field of Search .................... 252/68; 62/84, 62/468, 471, 473, 192, 502

(56) References Cited

U.S. PATENT DOCUMENTS

| | | | |
|---|---|---|---|
| 4,851,144 A | | 7/1989 | McGraw et al. ............ 252/52 A |
| 4,948,525 A | | 8/1990 | Sasaki et al. .............. 252/52 A |
| 5,027,606 A | * | 7/1991 | Short ............................ 62/84 |
| 5,185,092 A | | 2/1993 | Fukuda et al. ............. 252/56 S |
| 5,211,884 A | | 5/1993 | Bunemann et al. ........ 252/56 S |
| 5,254,280 A | | 10/1993 | Thomas et al. ............... 252/68 |
| 5,355,695 A | * | 10/1994 | Kawaguchi et al. |
| 5,369,287 A | | 11/1994 | Sunaga et al. ............... 252/50 |
| 5,395,544 A | * | 3/1995 | Hagihara et al. ............. 252/68 |
| 5,403,503 A | | 4/1995 | Seiki et al. ................ 252/52 A |
| 5,431,835 A | | 7/1995 | Katafuchi et al. ............ 252/68 |
| 5,470,497 A | * | 11/1995 | Schlosberg et al. .......... 252/68 |
| 5,494,597 A | * | 2/1996 | Krevalis, Jr. et al. ........ 252/68 |
| 5,554,311 A | * | 9/1996 | Katafuchi et al. ............ 252/68 |
| 5,705,086 A | | 1/1998 | Ardito et al. ................. 252/68 |
| 5,716,916 A | * | 2/1998 | Shiokawa et al. .......... 508/485 |
| 5,792,383 A | * | 8/1998 | Reyes-Gavilan et al. ..... 252/68 |
| 5,806,336 A | * | 9/1998 | Sunaga et al. ............... 62/469 |
| 6,167,719 B1 | * | 6/2001 | Yakumaru et al. |

FOREIGN PATENT DOCUMENTS

| | | |
|---|---|---|
| EP | 0343662 A2 | 11/1989 |
| EP | 0 377 122 A1 | 7/1990 |
| EP | 0580308 A1 | 2/1994 |
| EP | 0622445 A1 | 11/1994 |
| EP | 0801129 A2 | 4/1996 |
| JP | 5-17789 | * 1/1993 |
| JP | 9-302370 | * 11/1997 |
| JP | 10-46170 | * 2/1998 |
| WO | 90/12849 | * 11/1990 |
| WO | WO 94/16028 | 7/1994 |

* cited by examiner

*Primary Examiner*—Margaret Einsmann
(74) *Attorney, Agent, or Firm*—Samuel B. Laferty; Michael F. Esposito

(57) ABSTRACT

A lubricant-refrigerant composition contained within a compression refrigeration system is disclosed which comprises (A) at least one fluorine-containing hydrocarbon refrigerant containing 1 to 3 carbon atoms, further wherein fluorine is the only halogen in said fluorine-containing hydrocarbon with the proviso that 1,1,1,2-tetrafluoroethane is not the sole refrigerant; and (B) at least one lubricant comprising
(1) a hydrocarbyl substituted arene,
(2) a phosphate ester,
(3) an organic ester of a carboxylic acid and an alcohol,
(4) a perfluoropolyethylene,
(5) an ether;
(6) a polyether;
(7) a polyalphaolefin; or
(8) a mineral oil;

wherein at a temperature of above −60° C. a phase separation occurs such that at least two phases are formed, said phases being a refrigerant rich phase and a lubricant rich phase, further wherein the lubricant rich phase resides below the refrigerant rich phase.

6 Claims, 1 Drawing Sheet

LUBRICANT REFRIGERANT COMPOSITION FOR HYDROFLUOROCARBON (HFC) REFRIGERANTS

FIELD OF THE INVENTION

This invention is directed to a compression heat transfer system containing refrigerants and lubricants wherein there is partial to near immiscibility of one in the other at above a certain temperature. The lubricant or lubricant-rich phase (where there is some miscibility of the lubricant and refrigerant) resides on the bottom of the refrigerant or refrigerant-rich phase (where there is some miscibility of the lubricant and refrigerant).

BACKGROUND OF THE INVENTION

Compression heat transfer system designers must consider lubricant circulation and return of the lubricant to a sump or reservoir when designing and evaluating a refrigeration system. The primary function of the lubricant is to lubricate and seal compressor components. In some applications, such as an oil flooded rotary screw compressor, the lubricant also functions as a heat transfer medium, removing the heat of compression. Design of the refrigeration system must include a method to keep the majority of the lubricant in the compressor, and to provide a means to return, in an efficient manner, the oil which has entered the refrigeration system back to the reservoir.

Chlorofluorocarbon compounds, generally referred to in the industry as CFCs are comprised entirely of carbon, chlorine and fluorine, but no presence of hydrogen atoms. Molecules that also contain hydrogen are designated as HCFCs. Molecules containing only carbon, hydrogen and fluorine, but no presence of chlorine, are designated as HFCs.

U.S. Pat. No. 4,851,144 (McGraw et al., Jul. 25, 1989) relates to lubricant base compositions for compression refrigeration that are composed of 95 to 5% by weight of polyether polyols having a number average molecular weight from about 400 to about 5,000 and 5 to 95% of esters made from polyhydric alcohols with alkanoic acids or esters made from alkanedioic acids with alkanols. A refrigeration fluid is made from the base composition with the addition of selected hydrochlorofluorocarbons and hydrofluorocarbons so that the base composition is miscible with the refrigerant in the range from –20° C. to greater than 65° C.

U.S. Pat. No. 4,948,525 (Sasaki et al., Aug. 14, 1990) discloses a lubricating oil composition for a refrigerator using therein 1,1,1,2-tetrafluoroethane as the refrigerant, comprising as the base oil a polyoxyalkylene glycol monoether of the following general formula

wherein $R_1$ is an alkyl group having 1–18 carbon atoms, m is an integer of 5–70, $R_2$ is an alkylene group having 2–4 carbon atoms and a ratio of 0–0.8 between (the number of —$OR_2$— group wherein $R_2$ is ethylene group)/m in the molecule, the polyoxyalkylene glycol monoether having a specified pour point and a specified kinematic viscosity. In one embodiment, the lubricating oil composition may further comprise a specified phosphate and at least one kind of a specified epoxy compound to further improve the oil composition in properties.

U.S. Pat. No. 5,027,606 (Short, Jul. 2, 1991) relates to a rotary displacement compression heat transfer system and method for improving its efficiency which includes a rotary displacement compressor for compressing a refrigerant, a condenser connected with the outlet of the compressor, an evaporator connected with the inlet of the compressor, an oil pump for injecting oil into the compressor, an oil separator for separating out the oil and recirculating it to the compressor, a non-chlorinated hydrocarbon refrigerant, and a synthetic oil ingredient in the oil providing an inverse solubility characteristic where a mixture of the refrigerant and oil has two immiscible phases in the compressor's operating temperature range and has only one dissolved liquid phase at a temperature in the evaporator's operating range at a weight concentration of oil less than about 5%.

U.S. Pat. No. 5,185,092 (Fukuda et al., Feb. 9, 1993) describes a lubricating oil for refrigerators using 1,1,1,2-tetrafluoroethane refrigerant. Having esters as base oil, its viscosity range is between 2–30 mm/s at 100° C. By adding esters alone or by adding esters having different viscosity to esters base oil, or by adding polymer, the viscosity is adjusted to obtain the lubricating oil suitable for various types of refrigerators. The lubricating oil thus obtained has excellent compatibility with 1,1,1,2-tetrafluoroethane refrigerant, which is an alternative to freon, and has low hygroscopic property and high heat-resistant property.

By reducing the total acid number to 0.05 mg KOH/g or less, the corrosion resistant property and insulating property of lubricating oil are not decreased, and the lubricating oil for refrigerator having high refrigerant stability, hydrolytic stability and insulating property can be obtained.

Further, by adding sulfur type anti-wear agent, the better anti-wear effect of the lubricating oil can be obtained on iron/aluminum contact portion in the refrigerator.

U.S. Pat. No. 5,211,884 (Bunemann et al., May 18, 1993) describes a lubricant/working fluid composition for use in mechanical vapor compression type heat transfer devices wherein the working fluid is preferably tetrafluoroethane and the lubricant is an ester which is miscible with the working fluid at 10% over a temperature range of –50° C. to +80° C., and has a viscosity of 5 to 100 cSt at 40° C. Useful esters include pentaerythritol partial ester of straight chain $C_5$ or branched chain $C_7$ carboxylic acids. The esters are compatible with non-chlorine containing working fluids and exhibit a low level of corrosion.

U.S. Pat. No. 5,254,280 (Thomas et al., Oct. 19, 1993) is directed to polyoxyalkylene glycols which are used to flush currently used lubricants such as mineral oil, alkyl benzenes, and esters from a refrigeration system for conversion to fluorocarbon or hydrofluorocarbon refrigerants. The polyoxyalkylene glycol is selected from the group consisting of polyoxyalkylene glycol which is at least difunctional with respect to hydroxyl groups, polyoxyalkylene glycol having an alkyl cap on one end thereof, and polyoxyalkylene glycol having at least two alkyl caps. The polyoxyalkylene glycol has a molecular weight of about 300 to 4,000, has a viscosity of about 5 to 150 centistokes at 37° C., and is made from alkylene oxide having at least 4 carbon atoms.

U.S. Pat. No. 5,369,287 (Sunaga et al., Nov. 29, 1994) relates to 1,1,1,2-tetrafluoroethane used in a refrigerator as the refrigerant, while a polyolester oil which is well compatible with the refrigerant is used as the base oil and a phenolic antioxidant, a specified amine and a phosphoric triester are added thereto to give a refrigerator oil composition. Thus the hydrolysis of the polyolester oil can be prevented to thereby protect the sliding members such as a roller and a vane from the corrosion and wear which are caused by the hydrolysis.

U.S. Pat. No. 5,395,544 (Hagihara et al., Mar. 7, 1995) is directed to a working fluid composition for a refrigerating machine which contains difluoromethane and a refrigeration oil. An ester formed between (a) an aliphatic polyhydric alcohol having a carbon number of 2 to 12; and (b) a saturated aliphatic monocarboxylic acid having a carbon number of 4 to 9 or a derivative thereof, the ratio of the number of acyl groups having a branched chain or branched chains to the number of the entire acyl groups in the ester being not less than 95%, is used as a base oil of the refrigeration oil. The working fluid composition for refrigerating machine of the present invention is excellent not only in compatibility, lubricity, and electric insulating property but also in thermal stability as compared to the conventional products.

U.S. Pat. No. 5,403,503 (Seiki et al., Apr. 4, 1995) discloses a refrigerator oil composition for hydrogen-containing hydrofluorocarbons (hydrogenated Flon compound) refrigerant which comprises a polyoxyalkylene glycol derivative and/or a specific polyester compound, which are/is compounded with (a) an aliphatic acid partially esterified with a polyhydric alcohol and (b) a phosphate compound and/or a phosphite compound. The refrigerator oil composition according to the present invention can be utilized as a refrigerator oil effective for improving wear resistance, especially that between aluminum material and steel material owing to the excellent miscibility with hydrogenated Flon refrigerant such as Flon 134a as well as prominent lubricant performance.

U.S. Pat. No. 5,431,835 (Katafuchi et al., Jul. 11, 1995) relates to a lubricant for refrigerating machines employing tetrafluoroethane or the like as a refrigerant which comprises as an essential component a base oil comprising (A) 40 to 95% by weight of a synthetic oil composed of a poly-α-olefin and/or an ethylene/α-olefin copolymer or a mixture of an alkyl-benzene and a poly-α-olefin and/or an ethylene/α-olefin copolymer and (B) 5 to 60% by weight of a fluidity improver composed of a polyoxyalkylene glycol compound, etc. The lubricant is used along with a refrigerant comprising a substituted flon compound such as 1,1,1,2-tetrafluoroethane (R-134a), and is excellent in the performance such as wear resistance, electrical insulating properties, hydrolytic stability, nonhydrogroscopicity, etc. and also in returnability of the lubricant. Thus, the lubricant is especially effective when used in automobile or household air conditioners, refrigerators, etc. having high industrial usefulness.

U.S. Pat. No. 5,554,311 (Katafuchi et al., Sep. 10, 1996) discloses a lubricant composition for compression-type refrigerating machines containing etra-fluoroethane or the like as a refrigerant and a lubricant comprising (A) 40 to 95% by weight of a synthetic oil composed of a poly-α-olefin and/or an ethylene/α-olefin copolymer or a mixture of an alkylbenzene and a poly-α-olefin and/or an ethylene/α-olefin copolymer and (B) 5 to 60% by weight of a fluidity improver composed of both or either of an ester compound and a triglyceride. The lubricant composition is excellent in the performance such as wear resistance, electrical insulating properties, hydrolytic stability, nonhygroscopicity, etc. and also in returnability of the lubricant composition. Thus, the lubricant is especially effective when used in automobile or household air condition, refrigerator, etc. having high industrial usefulness.

U.S. Pat. No. 5,705,086 (Ardito et al., Jan. 6, 1998) relates to esters that function as refrigeration lubricants in compression refrigeration units. The ester exhibits a balance of performance characteristics, notably in the combination of good miscibility, hydrolytic stability and wear resistance coupled with a viscosity within the range required in many commercial refrigeration units. These esters are of a hindered dihydric or trihydric alcohol such as trimethylolpentanediol and a fatty acid, where at least 80 number percent of the acyl groups are straight chain groups.

European Patent No. 377,122 (Kawaguchi et al., publication date 11.07.90) relates to a novel lubricating oil for refrigerators with compressor. More particularly, the reference relates to a lubricating oil for refrigerators with a compressor (compression-type refrigerators), comprising as the main component a polyoxyalkyleneglycol derivative having a high lubricating property as well as a favorable compatibility with hydrogen-containing flon compounds such as 1,1,1,2-tetrafluoroethane which can substitute for flon compounds such as dichlorodifluoromethane used as refrigerant and involved in environmental pollution problems.

WO 90/12849 (Jolley, International publication date 01.11.90) describes (A) a major amount of at least one fluorine containing hydrocarbon containing one or two carbon atoms; and (B) a minor amount of at least one soluble organic lubricant comprising at least one carboxylic ester of a polyhydroxy compound containing at least 2 hydroxy groups and characterized by the general formula $$R[OC(O)R^1]_n \qquad (I)$$

wherein R is a hydrocarbyl group, each $R^1$ is independently hydrogen, a straight chain lower hydrocarbyl group, a branched chain hydrocarbyl group, or a straight chain hydrocarbyl group containing from 8 to about 22 carbon atoms provided that at least one $R^1$ group is hydrogen, a lower straight chain hydrocarbyl or a branched chain hydrocarbyl group, or a carboxylic acid- or carboxylic acid ester-containing hydrocarbyl group, and n is at least 2.

Liquid compositions also are described wherein the fluorine-containing hydrocarbons also contain other halogen such as chlorine. The liquid compositions are useful particularly as refrigeration liquids in refrigerators and air-conditioners including auto, home and industrial air-conditioners.

SUMMARY OF THE INVENTION

A lubricant-refrigerant composition is disclosed which comprises (A) at least one fluorine-containing hydrocarbon refrigerant containing 1 to 3 carbon atoms, further wherein fluorine is the only halogen in said fluorine-containing hydrocarbon with the proviso that 1,1,1,2-tetrafluoroethane is not the sole refrigerant; and (B) at least one lubricant comprising
 (1) a hydrocarbyl substituted arene,
 (2) a phosphate ester,
 (3) an organic ester of a carboxylic acid and an alcohol,
 (4) a perfluoropolyethylene,
 (5) an ether of the structure

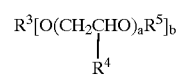
$$R^3[O(CH_2CHO)_aR^5]_b$$
$$\qquad\qquad |$$
$$\qquad\quad R^4$$

wherein $R^3$ is hydrogen, a hydrocarbon group containing from 1 to 20 carbon atoms, or an alkyl substituted aromatic wherein the alkyl group contains from 1 to 12 carbon atoms, $R^4$ is independently hydrogen, methyl or ethyl, $R^5$ is hydrogen or a hydrocarbon group containing from 1 to 20 carbon atoms or an acyl group containing from 2 to 20 carbon atoms, b is an integer of from 1 to 10 and a is an integer such that the product of a and b is at least two;
(6) a polyether wherein the polyether is prepared by polymerizing an ether of the structure $$CH_2=CHR^1O—R^2$$

wherein $R^1$ is hydrogen or an alkyl group containing from 1 to 4 carbon atoms and $R^2$ is an aliphatic group containing from 1 to 4 carbon atoms,
(7) a polyalphaolefin; or
(8) a mineral oil;
wherein at a temperature of −60° C. or higher a phase separation occurs such that at least two phases are formed, said phases being a refrigerant rich phase and a lubricant rich phase, further wherein the lubricant rich phase resides below the refrigerant rich phase. This invention also relates to a method of separating a lubricant-refrigerant composition and returning a lubricant rich phase of the lubricant from a refrigerant rich phase of the refrigerant to a compressor, which comprises;
permitting a liquid phase separation between the lubricant rich phase and the refrigerant rich phase wherein at a temperature of above −60° C. the lubricant rich phase resides below the refrigerant rich phase;
removing the lower layer lubricant rich phase away from the upper layer refrigerant rich phase, and
returning the lubricant rich phase to the compressor; wherein the refrigerant and lubricant comprise the aforementioned components (A) and (B). Further, this invention relates to a compression refrigeration system, comprising;
a compressor, a condenser, an oil return valve, an oil return line, an expansion valve and an evaporator wherein the system is charged with a composition comprising the aforementioned components (A) and (B).

DETAILED DESCRIPTION OF THE INVENTION COMPRESSORS AND THE REFRIGERATION CYCLE

Figure 1:
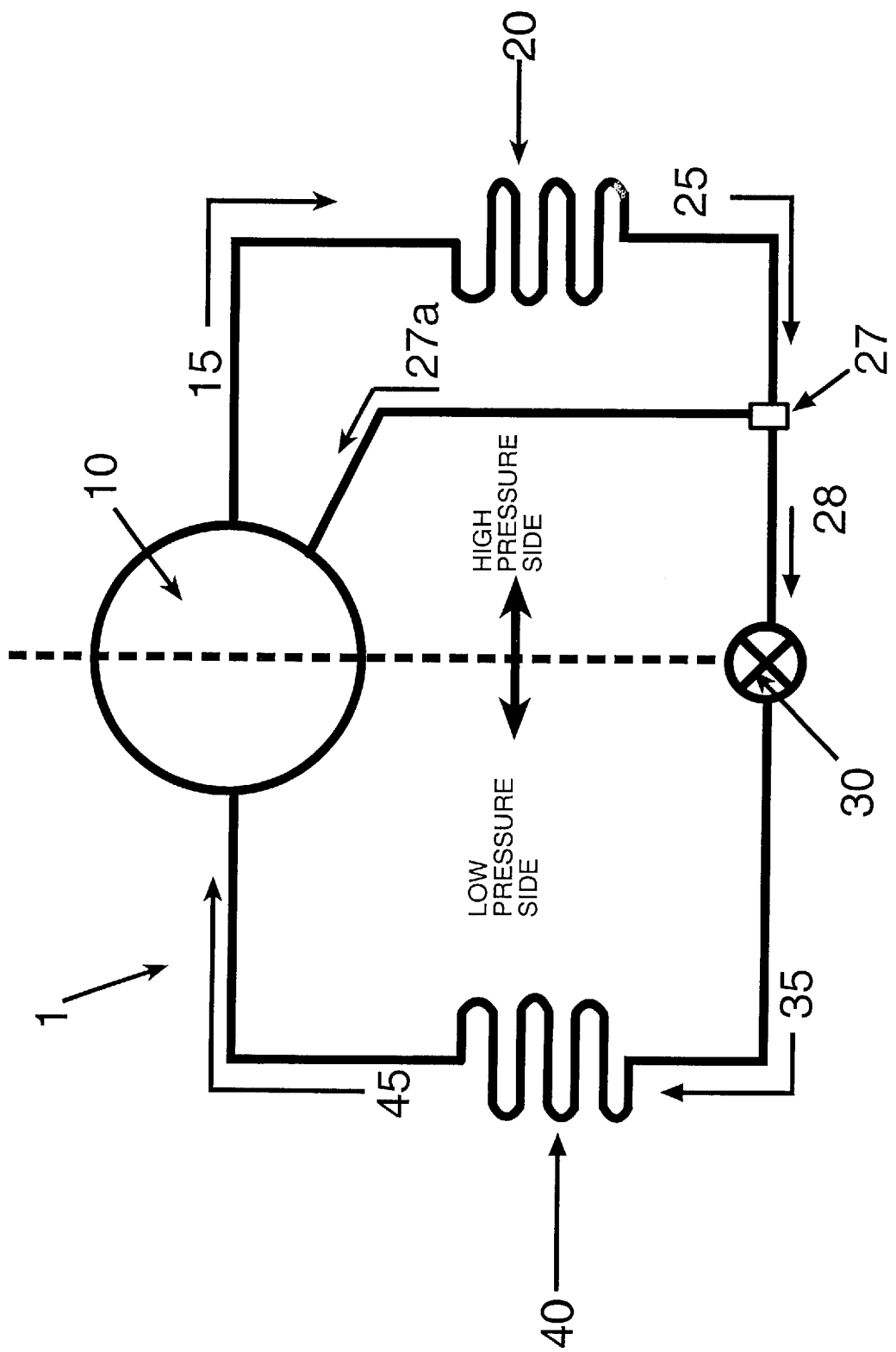
FIG. 1 is a schematic diagram of the basic mechanical compression refrigeration cycle.

Compressors are machines that draw in a gas and deliver the gas at a higher pressure and temperature than at intake. The higher pressure of the gas is generally used to do useful work. Compressors are normally driven by an electric motor, steam turbine or internal combustion engine and come in a variety of types and sizes, depending on the application need. Refrigeration and air conditioning can be considered as compressor applications.

Refrigeration compressors are classified as either positive displacement or dynamic compressors. Positive displacement compressors increase the pressure of a refrigerant gas by decreasing the volume of the gas. Examples include reciprocation (single and double acting), sliding vane rotary screw and scroll compressors.

Dynamic compressors such as multistage centrifugal compressors are used in large air conditioning facilities. In these compressors, the refrigerant is channeled through the machine which is designed to impart velocity to the refrigerant and then convert the velocity (kinetic energy) into pressure by moving the gas through diffusers.

Both positive displacement and dynamic compressors are often found in hermetic or semi-hermetic type designs. All of the moving parts, including the electric motor, are sealed inside these types of refrigeration systems. This design is almost always found in the refrigeration system of refrigerator/freezers and centrifugal chillers. Thus, lubricants for this type of service should be compatible with the system elastomers and other varnish materials found in electric motors. They also should have a high dielectric strength (25 kilovolts minimum).

Compression refrigeration systems are widely used in both domestic and industrial applications. The primary components of this cycle are shown in FIG. 1.

There are six essential parts to the compression refrigeration system 1; a compressor 10, a condenser 20, an oil return valve 27, an oil return line 27a, an expansion valve (in some cases, the capillary tube) 30 and the evaporator 40. Larger industrial units also contain refrigerant receivers to collect liquid refrigerant under pressure prior to the expansion valve.

The compression refrigeration system is charged with a refrigerant and a lubricant. Referring to the refrigeration cycle in FIG. 1, the compressor 10 compresses the incoming low-pressure refrigerant gas 45 from the evaporator 40 and discharges the refrigerant gas and also some lubricant at a higher pressure and temperature 15. The discharged refrigerant gas and lubricant 15 from the compressor 10 passes through the condenser (or cooling coils) 20. Here the latent heat of vaporization is removed, condensing it into a high pressure liquid. 25 The high pressure liquid 25 separates into two layers. The upper layer is the refrigerant rich phase and the lower layer is the lubricant rich phase. Within the condenser, some of the refrigerant and lubricant are soluble of one in the other. When the two liquid layers 25 are present, the bottom layer, which is the lubricant rich phase, is drained off at oil return valve 27 and returned to the compressor via oil return line 27a. The refrigerant rich phase liquid 28 left behind after removal of the lubricant rich phase passes through the expansion valve 30, which reduces the pressure on the liquid 35 and, therefore, its boiling point. As the low pressure liquid 35 passes through the evaporator, or cooling unit 40, it absorbs heat from the surroundings and vaporizes, producing a cooling effect. The low-pressure gas 45 flows from the evaporator 40 and is ready for another cycle to begin.

The refrigeration compressor is a motor-driven device which moves the heat-laden vapor refrigerant from the evaporator and compresses it into a small volume and to a high temperature. Compressors can be external drive where a crankshaft extends through the crankcase. The crankshaft is driven by a flywheel (pulley) and belt or by an electric motor. Compressors can also be hermetic in that the motor is sealed inside a dome or housing with the compressor and is directly connected to the compressor. Additionally, compressors can also be semi-hennetic in design where there is separation of the motor from the compressor; however, the whole unit is sealed inside a housing.

The five basic types of compressor that can be used within this invention are reciprocating (piston-cylinder), rotary, screw type, certrifugal and scroll. All of these compressors are fitted with an oil return line.

Evaporators are mainly of two types, a dry system and a flooded system. Refrigerant is fed into the dry system evaporator only as fast as is needed to maintain the desired temperature of the room, house or space to be cooled. In the flooded system, the evaporator is always filled with liquid refrigerant.

Nomenclature

Chlorofluorocarbon compounds (CFCs) are comprised entirely of carbon, chlorine and fluorine atoms. Molecules that also contain hydrogen are designated as HCFCs. Molecules containing only carbon, hydrogen and fluorine (no chlorine) are designated as HFCs. However, these distinctions are not always observed in the technical literature and "CFC" is sometimes used in reference to all three molecular types.

In general, refrigerants are designated with an "R" (Refrigerant) prefix and a two or three digit number. Single component refrigerants are denoted as R-XYZ wherein X represents the number of carbon atoms less 1, Y represents the number of hydrogen atoms plus 1 and Z represents the number of fluorine atoms. In the case of single carbon molecules, the first digit disappears and the refrigerant only has a two digit designation. If the molecule has no hydrogen atoms, the value of Y is 1. All other atoms are assumed to be chlorine. A lower case letter is sometimes added as a suffix to distinguish among possible isomers in two-carbon molecules. In three-carbon molecules, two lower case letters are sometimes added as a suffix.

The refrigerant chlorodifluoromethane

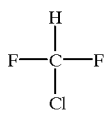

has one carbon atom (X=1−1=0), one hydrogen atom (Y=1+1=2) and 2 fluorine atoms (Z=2) such that R-XYZ is R-22.

The refrigerant 1,1,1,2-tetrafluoroethane

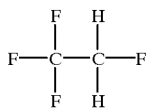

has two carbon atoms (X=2−1=1), two hydrogen atoms (Y=2+1=3) and 4 fluorine atoms (Z=4) such that R-XYZ is R-134a. This particular refrigerant compound receives an "a" suffix to designate that the structure is "asymmetric," meaning not symmetrical, with both hydrogen atoms attached to the same carbon atom. Its isomer is 1,1,2,2-tetrafluoroethane

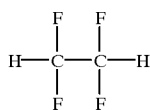

which is symmetrical and this refrigerant is designated R-134.

The same nomenclature procedure is used in beginning with a refrigerant designation, i.e., R-123. Letting the X=1, Y=2 and Z=3, these values generate a structure having 2 carbon atoms (X=2−1=1), 1 hydrogen atom (Y=1+1=2) and 3 fluorine atoms (Z=3). All other atoms are assumed to be chlorine. Thus R-123 is an isomer of dichlorotrifluoroethane and specifically is 1,1-dichloro-2,2,2-trifluoroethane.

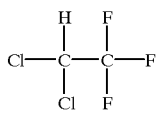

In the case of molecules that can have more than one asymmetric configuration, the nomenclature is more complex in terms of assigning suffix letter designations.

This same numbering system is followed in the propane series. However, two appended lowercase letters are usually added. The first appended letter indicates the substitution on the central carbon atom (C2):
—CCl$_2$—a
—CClF—b
—CF$_2$—c
—CClH—d
—CFH—e
—CH$_2$—f The second appended letter indicates the relative symmetry of the substituents on the end carbon atoms (C1 and C3). Symmetry is determined by first summing the atomic masses of the halogen and hydrogen atoms attached to the C1 and C3 carbon atoms. One sum is subtracted from the other; the smaller the absolute value of this difference, the more symmetrical the isomer. In contrast to the ethane series, however, the most symmetrical isomer has a second appended letter of α (as opposed to no appended letter for ethane isomers). Increasingly, asymmetrical isomers are assigned successive letters. Appended letters are omitted when no isomers are possible, and the number alone represents the molecular structure unequivocally; for example CF$_3$CF$_2$CF$_3$ is designated as R-218 and not R-218ca.

Following the above three carbon rules, the refrigerant CF$_3$CF$_2$CH$_3$ has an R number of 245. The central carbon is —CF$_2$—, which means that the first appended letter is c. Only one other isomer of C$_3$H$_3$F$_5$ can be drawn wherein the central carbon atom is —CF$_2$—. That other structure is CH$_2$FCF$_2$CHF$_2$. The second structure is more symmetrical since the absolute difference of the substituents of C1 and C3 are 18 whereas within the first structure the absolute difference of the substituents is 54. The second structure is designated as R-245ca, it being most symmetrical, and the first structure is designated as R-245cb.

The refrigerant C$_3$H$_2$F$_6$ wherein the central carbon atom is —CH$_2$— has no isomers. The only structure that can be drawn with this central atom is CF$_3$CH$_2$CF$_3$. A —CH$_2$— central atom is designated as f. In the propane series, this structure is symmetrical and is designated as such by the second letter a. This structure is designated as 236fa.

Other chemical types of refrigerants are designated as follows:

| | |
|---|---|
| C300 series | Cyclic Organic |
| 400 series | Zeotropes |
| 500 series | Azeotropes |
| 600 series | Miscellaneous Organic |
| 700 series | Inorganic |
| 1000 series | Unsaturated Organic |

Throughout this specification and claims, all parts and percentages are by weight, temperatures are in degrees Celsius, and pressures are at or near atmospheric pressure unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecule (that is, any two indicated substituents may together form a ring). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, hydrocarbylene, alkylene, alkyl, alkenyl, alkoxy, and the like, is intended to describe such groups which contain a total of up to 7 carbon atoms.

(A) Fluorine-Containing Hydrocarbon

The lubricant refrigerant compositions of the present invention comprise at least one fluorine-containing hydrocarbon, further fluorine is the only halogen in said fluorine-containing hydrocarbon. That is, the fluorine-containing hydrocarbons contain at least one C—H bond as well as C—F bonds. Because the liquid compositions of the present invention are primarily intended for use as refrigerants, the fluorine-containing hydrocarbon preferably contains one to three carbon atoms, and more preferably two carbon atoms.

These compounds containing only carbon, hydrogen and fluorine are referred to herein as hydrofluorocarbons (HFCs). Hydrocarbons containing chlorine as well as fluorine and hydrogen are referred to as hydrochlorofluorocarbons (HCFCs). The fluorine-containing hydrocarbons useful in the composition of the present invention are to be distinguished from the fully halogenated hydrocarbons which have been and are being used as propellants, refrigerants and blowing agents such as CFC-1 1, CFC-12 and CFC-113 which have been described in the background.

Ozone depletion potential of fluorine-containing hydrocarbons that are utilized in this invention are all zero. Specific examples of useful fluorine-containing hydrocarbons are the previously mentioned R-134a, R-404A, R-407C and R-410A. Other fluorine-containing hydrocarbons that are useful are R-23 (trifluoromethane), R-32 (difluoromethane), R-143a (1,1,1-trifluoroethane), R-152a (1,1-difluoroethane), and R-134 (1,1,2,2-tetrafluoroethane). Useful fluorine-containing hydrocarbons that contain three carbon atoms as R-245cb (1,1,1,2,2-pentafluoropropane), R-245fa (1,1,1,3,3-pentafluoropropane) and R-236fa (1,1,1, 3,3,3-hexafluoropropane).

In general, fluorine-containing hydrocarbons which are useful as refrigerants are fluoromethanes and fluoroethanes boiling at a relatively low temperature at atmospheric pressure, e.g., below 30° C. Mixtures of fluorine-containing hydrocarbons may be used, and the amount of each fluorohydrocarbon in the mixture may be varied as desired. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure. It is to be noted that within this invention R-134a is never utilized as the sole refrigerant. R-134a is only utilized with other fluorine-containing refrigerants.

Preferably, at least two fluorine-containing hydrocarbons are utilized as refrigerants. These refrigerants are selected from the group consisting of tetrafluoromethane (R-14), trifluoromethane (R-23), difluoromethane (R-32), monofluoromethane (R-41), hexafluoroethane (R-116), pentafluoroethane (R-125), the isomeric tetrafluoroethanes (R-134 and R-134a), the isomeric trifluoroethanes (R-143 and R-143a) and the isomeric difluoroethanes (R-152 and R-152a). When two or more fluorine-containing hydrocarbons are utilized, they may be a zeotropic blend or an azeotropic blend.

A zeotropic blend is a blend comprising multiple components of different volatilities that, when used in refrigeration cycles, change volumetric composition and saturation temperatures as they evaporate (boil) or condense at constant pressure. The word is derived from the Greek words Zein (to boil) and tropos (to change). An azeotropic blend is a blend comprising multiple components of different volatities that, when used in refrigeration cycles, do not change volumetric composition or saturation temperature as they evaporate (boil) or condense at constant pressure. The term "near azeotropic" is defined as a zeotropic blend with a temperature glide sufficiently small that it may be disregarded without consequential error in analysis for a specific application. The term "temperature glide" is defined as the absolute value of the difference between the starting and ending temperatures of a phase-change process by a refrigerant within a component of a refrigerating system, exclusive of any subcooling or superheating. This term usually describes condensation or evaporation of a zeotrope.

Zeotropic blends having utility in this invention are R-404A which is a blend of R-125, R-143a and R-134a in a percent weight of 44/52/4, respectively; R-407A, a blend of R-32, R-125 and R-134a (20/40/40); R-407B, a blend of R-32, R-125 and R-134a (10/70/20), R-407C, a blend of R-32, R-125 and R-134a (52/25/23) and R-410A, a blend of R-32 and R-125 (50/50). An azeotropic blend having utility in this invention is R-507, which is a blend of R-125 and R-143a (50/50).

(B) The Lubricant

The lubricant refrigerant compositions of the present invention contain at least one lubricant comprising (1) a hydrocarbyl-substituted arene, (2) a phosphate ester, (3) an organic ester, (4) a perfluoropolyethylene, (5) an ether, (6) a polyether,
(7) a polyalphaolefin, or
(8) a mineral oil.

The viscosities of the above lubricants range from ISO viscosity grades 5 to 680, preferably 7–680 and most preferably from 10–460.

(B1) The Hydrocarbyl-Substituted Arene

For lubricant (B1), the hydrocarbyl-substituted arene is of the formula $(R^{11})_f$—Ar wherein $R^{11}$ is an aliphatic group, preferably an alkyl group, containing from 8 to 28 carbon atoms, f is an integer of from 1 to 3, and Ar is an aromatic moiety comprising a benzene or a naphthalene nucleus. Preferably, Ar is a benzene nucleus. Illustrative examples of (B1) are monoalkyl benzenes, dialkyl benzenes, monoalkyl naphthalene and dialkyl naphthalenes.

(B2) The Phosphate Ester

Two phosphate esters are envisioned as having utility in this invention. The first phosphate ester is a tertiary butylated phosphate of the formula

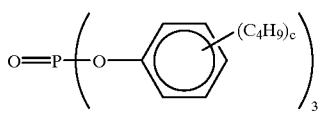
(B2a)

wherein c is an integer of from 1 up to 5.

The second phosphate ester is tertiary butylphenyl phosphate of the formula

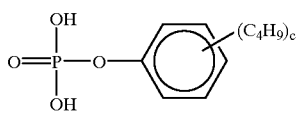
(B2b)

wherein c has the value as assigned above.

(B3) The Organic Ester

The organic ester (B3) is the reaction product of a carboxylic acid and a polyhydroxy compound wherein the ester is characterized by the general formula $$R^6[OC(O)R^7]_m \quad (I)$$

wherein $R^6$ is a hydrocarbyl group, each $R^7$ is independently (i) hydrogen, (ii) a straight chain lower hydrocarbyl group, (iii) a branched chain hydrocarbyl group, or (iv) a mixture of one or both of (ii) and (iii) with a straight chain hydrocarbyl group containing from about 8 to 14 carbon atoms, and m is at least 2.

The carboxylic esters utilized as Component (B3) in the liquid refrigerant compositions of the present invention are reaction products of one or more carboxylic acids (or the lower esters thereof such as methyl, ethyl, etc.) with polyhydroxy compounds containing at least two hydroxy groups. The polyhydroxy compounds may be represented by the general formula $$R^6(OH)_m \quad (II)$$

wherein $R^6$ is a hydrocarbyl group and m is at least 2. The hydrocarbyl group may contain from 4 to about 20 or more carbon atoms, and the hydrocarbyl group may also contain one or more nitrogen and/or oxygen atoms. The polyhydroxy compounds generally will contain from about 2 to about 10 hydroxy groups and more preferably from about 2 to about 6 hydroxyl groups. The polyhydroxy compound may contain one or more oxyalkylene groups and, thus, the polyhydroxy compounds include compounds such as polyetherpolyols. The number of carbon atoms and number of hydroxy groups contained in the polyhydroxy compound used to form the carboxylic esters may vary over a wide range.

The polyhydroxy compounds used in the preparation of the carboxylic esters (I) also may contain one or more nitrogen atoms. For example, the polyhydroxy compound may be an alkanol amine containing from 3 to 6 hydroxy groups. In one preferred embodiment, the polyhydroxy compound is an alkanol amine containing at least two hydroxy groups and more preferably at least three hydroxy groups.

Specific examples of polyhydroxy compounds useful in the present invention include ethylene glycol, diethylene glycol, triethylene glycol, propylene glycol, dipropylene glycol, glycerol, neopentyl glycol, 1,2-, 1,3- and 1,4-butanediols, pentaerythritol, dipentaerythritol, tripentaerythritol, triglycerol, trimethylolpropane, sorbitol, hexaglycerol, $^{2,2,4}$-trimethyl-1,3-pentanediol, etc. Mixtures of any of the above polyhydroxy compounds can be utilized.

The carboxylic acids utilized in the preparation of the carboxylic esters useful in the liquid refrigerant compositions of the present invention may be characterized by the following general formula $$R^7COOH \quad (III)$$

wherein $R^7$ is (i) hydrogen, (ii) a straight chain lower hydrocarbyl group, (iii) a branched chain hydrocarbyl group, or (iv) a mixture of one or both of (ii) and (iii) with a straight chain hydrocarbyl group containing from about 8 to about 14 carbon atoms. Stated otherwise, at least one $R^7$ group in the ester of Formula 1 must contain a lower straight chain hydrocarbyl group or a branched chain hydrocarbyl group. The straight chain lower hydrocarbyl group ($R^7$) contains from 1 to about 7 carbon atoms, and in a preferred embodiment, contains from 1 to about 5 carbon atoms. The branched chain hydrocarbyl group may contain any number of carbon atoms and will generally contain from 4 to about 20 carbon atoms. In one preferred embodiment, the branched chain hydrocarbon group contains from 5 to 20 carbon atoms and in a more preferred embodiment, contains from about 5 to about 14 carbon atoms.

In one preferred embodiment, the branched chain hydrocarbyl groups are characterized by the structures $$—C(R^8)(R^9)(R^{10})$$

wherein $R^8$, $R^9$ and $R^{10}$ are each independently alkyl groups, and at least one of the alkyl groups contains two or more carbon atoms. Such branched chain alkyl groups, when attached to a carboxyl group are referred to in the industry as neo groups and the acids are referred to as a neo acid. In one embodiment, $R^8$ and $R^9$ are methyl groups and $R^{10}$ is an alkyl group containing two or more carbon atoms.

Any of the above hydrocarbyl groups ($R^7$) may contain one or more carboxy groups or carboxy ester groups such as —COOR$^{11}$ wherein $R^{11}$ is a lower alkyl, hydroxy alkyl or a hydroxyalkyloxy alkyl group. Such substituted hydrocarbyl groups are present, for example, when the carboxylic acid R$^7$COOH (III) is a dicarboxylic acid or a monoester of a dicarboxylic acid. Generally, however, the acid R$^7$COOH (III) is a monocarboxylic acid since polycarboxylic acids tend to form polymeric products if the reaction conditions and amounts of reactants are not carefully regulated. Mixtures of monocarboxylic acids and minor amounts of dicarboxylic acids or anhydrides are useful in preparing the esters (I).

Examples of carboxylic acids containing a straight chain lower hydrocarbyl group include formic acid, acetic acid, propionic acid, butyric acid, pentanoic acid, hexanoic acid and heptanoic acid. Examples of carboxylic acids wherein the hydrocarbyl group is a branched chain hydrocarbyl group include 2-ethyl-n-butyric acid, 2-hexyldecanoic acid, isostearic acid, 2-methyl-hexanoic acid, 3,5,5-trimethyl-hexanoic acid, 2-ethylhexanoic acid, neoheptanoic acid, neodecanoic acid, and commercial mixtures of branched chain carboxylic acids such as the mixture identified as Neo 1214 acid from Exxon.

The third type of carboxylic acids which can be utilized in the preparation of the carboxylic esters are the acids containing a straight chain hydrocarbyl group containing from 8 to about 14 carbon atoms. As noted previously, these higher molecular weight straight chain acids can be utilized only in combination with one of the other acids described above since the higher molecular weight straight chain acids are not soluble in the fluorohydrocarbons. Examples of such higher molecular weight straight chain acids include decanoic acid, dodecanoic acid, lauric acid, stearic acid, myristic acid, behenic acid, etc. Examples of dicarboxylic acids include maleic acid, succinic acid, adipic acid, suberic acid, azelaic acid, sebacic acid, etc.

In another embodiment, the carboxylic acids utilized to prepare the esters may comprise a mixture of a major amount of monocarboxylic acids and a minor amount of dicarboxylic acids. The presence of the dicarboxylic acids results in the formation of esters of higher viscosity. The use of mixtures containing larger amounts of dicarboxylic acids should be avoided since the product ester will contain larger amounts of polymeric esters, and such mixtures may be insoluble in the fluorohydrocarbons. An example of such a mixture is 80 parts of neoheptanoic acid and 20 parts of succinic acid.

The carboxylic esters of Formula I are prepared, as mentioned above, by reacting at least one carboxylic acid with at least one polyhydroxy compound containing at least two hydroxy groups. The formation of esters by the interaction of carboxylic acids and alcohols is acid-catalyzed and is a reversible process which can be made to proceed to completion by use of a large amount of acid or by removal of the water as it is formed in the reaction. If the ester is formed by transesterification of a lower molecular weight carboxylic ester, the reaction can be forced to completion by removal of the lower molecular weight alcohol formed as a result of a transesterification reaction. The esterification reaction can be catalyzed by either organic acids or inorganic acids. Examples of inorganic acids include sulfuric acids, phosphoric acids and acidified clays. A variety of organic acids can be utilized including para-toluenesulfanic acid, acidic resins such as Amberlyst 15, etc. Organometallic catalysts include, for example, tetraisopropoxy orthotitanate. However, it is preferred that the esterification reaction is conducted in the absence of catalyst.

The amounts of carboxylic acids and polyhydroxy compounds included in the reaction mixture may be varied depending on the results desired. If it is desired to esterify all of the hydroxy groups containing in the polyhydroxy compounds, sufficient carboxylic acid should be included in the mixture to react with all of the hydroxyl groups. When mixtures of the acids are reacted with a polyhydroxy compound in accordance with the present invention, the carboxylic acids can be reacted sequentially with the polyhydroxy compounds or a mixture of carboxylic acids can be prepared and the mixture reacted with the polyhydroxy compounds. In one preferred embodiment wherein mixtures of acids are utilized, the polyhydroxy compound is first reacted with one carboxylic acid, generally, the higher molecular weight branched chain or straight chain carboxylic acid followed by reaction with the straight chain lower hydrocarbyl carboxylic acid. Throughout the specification and claims, it should be understood that the esters also can be formed by reaction of the polyhydroxy compound with the anhydrides of any of the above-described carboxylic acids. For example, esters are easily prepared by reacting the polyhydroxy compounds either with acetic acid or acetic anhydride.

The formation of esters by the reaction of carboxylic acids or anhydrides with the polyhydroxy compounds described above can be effected by heating the acids or anhydrides, the polyhydroxy compounds, and an acid catalyst to an elevated temperature while removing water or low molecular weight alcohols formed in the reaction. Generally, temperatures of from about 75° C. to about 200° C. or higher are sufficient for the reaction. The reaction is completed when water or low molecular weight alcohol is no longer formed, and such completion is indicated when water or low molecular weight esters can no longer be removed by distillation.

In some instances, it is desired to prepare carboxylic esters wherein not all of the hydroxyl groups have been esterified. Such partial esters can be prepared by the techniques described above and by utilizing amounts of the acid or acids which are insufficient to esterify all of the hydroxyl groups.

The following examples illustrate the preparation of various carboxylic esters which are useful as (B3) in the liquid refrigerant compositions of the invention.

EXAMPLE (B3)-1

Added to a flask equipped with a stirrer, thermowell, and distillation condenser are 635 parts (2.5 moles) dipentaerythritol, 1418 parts (13.9 moles) n-valeric acid, 79 parts (0.6 moles) n-heptanoic acid and 79 parts (0.5 moles) n-nonanoic acid. The contents are heated to 160° C. and held for 6 hours. The temperature is then increased to 220° C. and held for 48 hours. Water (250 ml) was removed during this time. The contents are vacuum stripped to remove any unreacted acid. The contents are then treated with 100 ml of a 5 percent by weight aqueous sodium hydroxide solution and stirred for 3 hours at 60° C. The contents are permitted to separate into phases. Any unreacted carboxylic acid is then reacted with the sodium hydroxide solution to form a sodium salt which is soluble in the aqueous phase. This aqueous phase is then removed and the sodium hydroxide procedure is repeated. Residual water is removed at 70° C. with nitrogen blowing at 3 cubic feet per hour. The contents are filtered using diatomaceous clay and alumina to give the desired product. Analyses: % water: 0.012; % OH: 0.012; total acid number: 0.00; 40° C. viscosity: 50 cSt; 100° C. viscosity: 8.18 cSt; VI: 138.

EXAMPLES 2–10 relate to the preparation of esters wherein the acid or acid mixtures are either all straight chain or non-branched at the alpha position. These examples are essentially prepared as per the procedure of Example 1.

EXAMPLE (B3)-2

Reacted together to form an ester are n-hexanoic acid and neopentyl glycol in a molar ratio of 2:1 respectively. The 40° C. viscosity is 5.6 cSt.

EXAMPLE (B3)-3

Reacted together to form an ester are n-octanoic acid and neopentyl glycol in a molar ratio of 2:1 respectively. The 40° C. viscosity is 7.0 cSt.

EXAMPLE (B3)-4

Reacted together to form an ester are n-nonanoic acid and neopentyl glycol in a molar ratio of 2:1 respectively. The 40° C. viscosity is 8.7 cSt.

EXAMPLE (B3)-5

Reacted together to form an ester are n-valeric acid and trimethylolpropane in a molar ratio of 3:1 respectively. The 40° C. viscosity is 9.4 cSt.

EXAMPLE (B3)-6

Reacted together to form an ester are n-heptanoic acid and trimethylol propane in a molar ratio of 3:1 respectively. The 40° C. viscosity is 13.9 cSt.

EXAMPLE (B3)-7

Reacted together to form an ester are n-valeric acid and mono-pentaerythritol in a molar ratio of 4:1 respectively. The 40° C. viscosity is 15.6 cSt.

EXAMPLE (B3)-8

Reacted together to form an ester are equal molar mixtures of n-valeric acid and n-heptanoic acid with mono-pentaerythritol in a 2:2:1 molar ratio respectively. The 400° C. viscosity is 18.6 cSt.

EXAMPLE (B3)-9

Reacted together to form an ester is an acid mixture of n-valeric acid, n-heptanoic acid and iso-nonanoic acid with mono-pentaerythritol in a molar ratio of 1.4:1.3:1.3:1 respectively. The 40° C. viscosity is 32.3 cSt.

EXAMPLE (B3)-10

Reacted together to form an ester is an acid mixture of n-valeric acid, iso-octanoic acid and iso-nonanoic acid with mono-pentaerythritol in a molar ratio of 0.8:1.2:2:1 respectively. The 40° C. viscosity is 68 cSt.

EXAMPLE (B3)-11

Added to a flask equipped as in Example (B3)-1 are 1040 parts (10 moles) neopentylglycol and 2880 parts (20 moles) 2-ethylhexanoic acid. The contents are heated to 180° C. and held for 5 hours while removing water. The temperature is then increased to 200° C. and held for 15 hours. Water (325 ml) is removed during this time. The temperature is then increased to 220° C. and held for 2 days. At this point the neutralization number is 0.4 acid. The formed ester is transferred to a separatory funnel and extracted twice with 100 ml portions of 5 percent aqueous sodium hydroxide followed by two extractions with water. A diatomaceous earth filtering aid is added and the ester is stirred for 2 hours at room temperature. The ester is then filtered through an alumina bed. Analyses: % OH: 0.04; total acid number: 0.01; 40° C. viscosity: 7.5 cSt; 100° C. viscosity: 2.05 cSt; VI: 51.

EXAMPLE (B3)-12 relates to the preparation of an ester wherein the acid is a branched chain acid at the alpha position. This example is essentially prepared as per Example (B3)-11.

EXAMPLE (B3)-12

Reacted together to form an ester are 2-ethylhexanoic acid and mono-pentaerythritol in a 4:1 molar ratio respectively. The 40° C. viscosity is. 46 cSt.

(B4) The Perfluoropolyethylene

The lubricant may comprise a perfluoropolyethylene oil (PFPE). These oils are produced by DuPont and sold under the trademark "KRYTOX". These materials are described as low molecular weight, fluorine end-capped, homopolymers of hexafluoropropylene oxide with known chemical structure.

(B5) The Ether

The lubricant may also comprise an ether of the structure

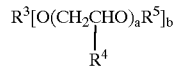

wherein $R^3$ is hydrogen, or a hydrocarbon group containing from 1 to 20 carbon atoms or an alkyl substituted aromatic wherein the alkyl group contains from 1 to 12 carbon atoms, $R^4$ is independently hydrogen, methyl or ethyl, $R^5$ is hydrogen or a hydrocarbon group containing from 1 to 20 carbon atoms or an acyl group containing from 2 to 20 carbon atoms, b is an integer of from 1 to 10 and a is an integer such that the product of a and b is at least two. When $R^5$ is a hydrocarbon group, preferably either from 1 to 6 aliphatic carbon atoms and most preferably from 1 to 4 carbon atoms are present or from 8 to 10 aliphatic carbon atoms are present. When $R^5$ is an acyl group, preferably from 2 to 10 carbon atoms are present.

As defined earlier, the hydrocarbon group may be a substituted hydrocarbon group, that is, having a substituent which does not alter the predominantly hydrocarbon character of the group. For $R^3$ and $R^5$, these substituents include hydroxy and alkoxy. Depending upon how the $R^4$ and $R^5$ groups are selected, the (B5) ether may be a polyglycol ether. When $R^3$ is selected to contain three carbon atoms, $R^4$ and $R^5$ are selected to be hydrogen, a is 4 and b is 2, such that the starting alcohol is 1,2-propanediol, then the ether is represented as

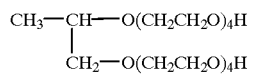

When $R^3$ is selected to contain three carbon atoms, $R^4$ and $R^5$ are selected to be hydrogen, a is 3 and b is 3, such that the starting alcohol is glycerol, then the ether is represented as

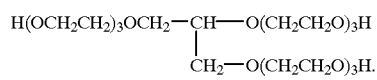

When $R^3$ contains two carbon atoms, $R^4$ and $R^5$ are hydrogen, a is 8 and b is 1, such that the starting alcohol is ethanol, the ether has the structure $$CH_3CH_2-O(CH_2CH_2O)_8H.$$

When $R^3$ contains two carbon atoms, $R^4$ and $R^5$ are hydrogen, a is 5 and b is 2, such that the starting alcohol is ethylene glycol, the ether has the structure $$H(OCH_2CH_2)_5O-CH_2CH_2-O(CH_2CH_2O)_5H.$$

When $R^3$ contains six carbon atoms, $R^4$ and $R^5$ are hydrogen, a is 3 and b is 3, such that the starting alcohol is trimethylolpropane, the ether may be represented as

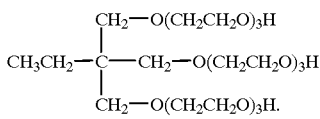

When $R^3$ contains five carbon atoms, $R^4$ and $R^5$ are hydrogen, a is 2 and b is 4, such that the starting alcohol is pentaerythritol, the ether may be represented as

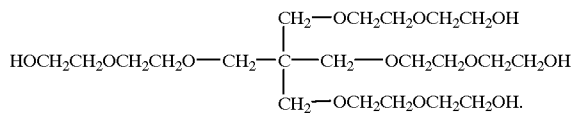

When $R^3$ contains one carbon atom, $R^4$ is methyl and $R^5$ is hydrogen, a is 9 and b is 1, such that the starting alcohol is methanol, the ether may be represented as

When $R^3$ contains one carbon atom, $R^4$ and $R^5$ are methyl, a is 9 and b is 1, such that the starting alcohol is methanol, the ether may be represented as

Within (B5), $R^3$ preferably is an alcohol residue containing up to 12 carbon atoms and, most preferably, is an alcohol residue containing up to 6 carbon atoms. $R^3$ may be a residue of a mono alcohol. R3 may be a phenol residue present as an alkyl substituted aromatic wherein the alkyl group contains from 1 to 12 carbon atoms. $R^3$ may also be a residue of a polyalcohol containing from 2 to 6 carbon atoms. Preferably, the polyalcohol is a diol and a preferred diol is ethylene glycol. Preferably, $R^4$ is hydrogen, or methyl and most preferably $R^4$ is a methyl group. Most preferably, $R^5$ is hydrogen. Preferably, a and b are independently at least 2 and most preferably are at least 4.

(B6) The Polyether

The polyether lubricant is prepared by polymerizing an ether represented by the structure

wherein $R^1$ is hydrogen or an alkyl group containing from 1 to 4 carbon atoms and $R^2$ is an aliphatic group containing from 1 to 8 carbon atoms, preferably 1 to 6 carbon atoms and most preferably 2 to 4 carbon atoms.

The polyether may be symmetrical or unsymmetrical. The polyether is symmetrical when $R^2$ is the same in all monomer units.

(B7) The Polyalphaolefin

Saturated olefin oligomers are a class of synthetic high-performance lubricants that have been developed to meet the increasingly stringent demands being placed on today's lubricants. The term polyalphaolefin, or PAO, is commonly used to designate such lubricants. PAOs are hydrocarbons manufactured by the catalytic oligomerization of linear -olefins having six or more carbon atoms.

PAOs are manufactured by a two-step reaction sequence from linear -olefins, which are derived from ethylene. The first step is synthesis of a mixture of oligomers, which are polymers of relatively low molecular weight. -olefin→dimer+trimer+tetramer+pentamer, etc.

The second step in the process entails hydrogenation of the unsaturated oligomer. The hydrogenation may be carried out before or after distillation. Distillation is required to remove any unreacted monomer, to separate the dimer, and in some cases to co-produce a lighter and a heavier grade of PAO.

(B8) The Mineral Oil

The mineral oils having utility are mineral lubricating oils such as liquid petroleum oils and solvent-treated or acid-treated mineral lubricating oils of the paraffinic, naphthenic or mixed paraffinic-naphthenic types. The mineral oils are based in particular on hydrocarbon compounds. The mineral oils are unrefined, refined and rerefined oils as well as mixtures of each with the other. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be unrefined oil.

Refined oils are similar to the unrefined oils except they have been further treated in one or more purification steps to improve one or more properties. Many such purification techniques are known to those skilled in the art such as solvent extraction, secondary distillation, hydrotreating, hydrocracking, acid or base extraction, filtration, percolation, etc.

Rerefined oils are obtained by processes similar to those used to obtain refined oils applied to refined oils which have already been used in service. Such refined oils are also known as reclaimed or reprocessed oils and often are additionally processed by techniques directed to removal of spent additives and oil breakdown products. Most preferably, the oil used herein is a petroleum-derived oil.

This invention is also directed to a method of operation using the components (A) and (B). This invention is also directed to a compression refrigeration system that uses components (A) and (B).

With respect to the operation, the invention is a method of separating a lubricant-refrigerant composition and returning a lubricant rich phase of the lubricant from a refrigerant rich phase of the refrigerant to a compressor, which comprises;

permitting a liquid phase separation between the lubricant rich phase and the refrigerant rich phase wherein at a temperature of above −60° C. the lubricant rich phase resides below the refrigerant rich phase;

removing the lower layer lubricant rich phase away from the upper layer refrigerant rich phase, and returning the lubricant rich phase to the compressor; wherein the refrigerant and lubricant comprise (A) at least one fluorine-containing hydrocarbon refrigerant containing 1 to 3 carbon atoms, further where fluorine is the only halogen in said fluorine-containing hydrocarbon with the proviso that 1,1,1, 2-tetrafluoroethane is not the sole refrigerant; and (B) at least one lubricant comprising
(1) a hydrocarbyl substituted arene,
(2) a phosphate ester,
(3) an organic ester of a carboxylic acid and an alcohol, (4) a perfluoropolyethylene,
(5) an ether of the structure

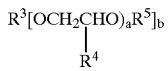

wherein $R^3$ is hydrogen, a hydrocarbon group containing from 1 to 20 carbon atoms, or an alkyl substituted aromatic wherein the alkyl group contains from 1 to 12 carbon atoms, $R^4$ is independently hydrogen, or ethyl, $R^5$ is acyl group containing from 2 to 20 carbon atoms, b is an integer of from 1 to 10 and a is an integer such that the product of a and b is at least two;
(6) a polyether wherein the polyether is prepared by polymerizing an ether of the structure

wherein $R^1$ is hydrogen or an alkyl group containing from 1 to 4 carbon atoms and $R^2$ is an aliphatic group containing from 1 to 8 carbon atoms,
(7) a polyalphaolefin; or
(8) a mineral oil.

With respect to the compression refrigeration system, the invention is a compression refrigeration system, comprising;
a compressor, a condenser, an oil return valve, an oil return line, an expansion valve and an evaporator wherein the system is charged with a composition comprising
(A) at least one fluorine-containing hydrocarbon refrigerant containing I to 3 carbon atoms, further wherein fluorine is the only halogen in said fluorine-containing hydrocarbon with the proviso that 1,1,1,2-tetrafluoroethane is not the sole refrigerant; and
(B) at least one lubricant comprising
(1) a hydrocarbyl substituted arene,
(2) a phosphate ester,
(3) an organic ester of a carboxylic acid and an alcohol,
(4) a perfluoropolyethylene,
(5) an ether of the structure

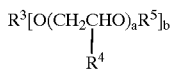

wherein $R^3$ is hydrogen, a hydrocarbon group containing from 1 to 20 carbon atoms, or an alkyl substituted aromatic wherein the alkyl group contains from 1 to 12 carbon atoms, $R^4$ is independently hydrogen, methyl or ethyl, $R^5$ is hydrogen or a hydrocarbon group containing from 1 to 20 carbon atoms or an acyl group containing from 2 to 20 carbon atoms, b is an integer of from 1 to 10 and a is an integer such that the product of a and b is at least two;
(6) a polyether wherein the polyether is prepared by polymerizing an ether of the structure

wherein $R^1$ is hydrogen or an alkyl group containing from 1 to 4 carbon atoms and $R^2$ is an aliphatic group containing from 1 to 8 carbon atoms,
(7) a polyalphaolefin; or
(8) a mineral oil;
wherein at a temperature of above −60° C. a phase separation occurs such that at least two phases are formed, said phases being a refrigerant rich phase and a lubricant rich phase, further wherein the lubricant rich phase resides below the refrigerant rich phase, such that the lubricant rich phase is separated from the refrigerant rich phase by the oil return valve and the lubricant rich phase returned to the compressor by the oil return line.

Prior to the Montreal Accord, when chlorine was permitted to be present within a refrigerant, most lubricants were soluble in the refrigerant and, additionally, did not cause a deleterious effect within the refrigeration system. Because of the Montreal Accord, today's refrigerants are chlorine free. The problem, however, is in finding suitable lubricants for fluorine-only refrigerants. The number of refrigerants soluble in fluorine-only refrigerants is small. Many lubricants either are not soluble or are only partially soluble in fluorine-only refrigerants. Further, when there is partial solubility, the solubility changes whenever the pressure or temperature changes. In the refrigeration cycle as outlined above, there is always present pressure and temperature changes, depending where the lubricant/refrigeration composition or mixture reside in the refrigeration cycle at a specific moment in time.

For partially soluble lubricant/refrigerant mixtures, it becomes necessary to minimize free lubricant on the low pressure, low temperature portion of the refrigeration cycle. Free lubricants in this portion of the system are known to cause problems related to efficiency, heat transfer and component operations.

The overall approach to refrigeration system design is to keep the majority of the free lubricant in the compressor portion of system. Any lubricant, either as free lubricant or generated free lubricant that leaves the compressor, must be returned to the compressor.

Within this invention, the free lubricant is returned to the compressor by taking advantage of the difference in densities between the refrigerant which, in actuality, is the refrigerant with a portion of lubricant dissolved therein to give a refrigerant rich phase and the lubricant, which is the lubricant with a portion of refrigerant dissolved therein to give a lubricant rich phase. That being the case, the lubricant rich phase resides below the refrigerant rich phase. To return the lubricant rich phase back to the compressor, it is only necessary to remove it at an oil return valve 27 between the condenser 20 and expansion valve 30, and return it to the compressor via oil return line 27a.

Having a drain line between the condenser and expansion valve is just one example of returning a lubricant rich phase to the compressor. Similarly, a low spot in the liquid line to the evaporator could be utilized to collect and return oil via a simple bottom/valve mechanism to the compressor. In addition, simplified oil return from the evaporator could be accomplished by judicious selection of refrigerant-lubricant pairs which afford two-phase characteristics which the bottom phase lubricant rich, simply by the use of appropriate bottom separation equipment.

As stated above, there must be immiscibility between the refrigerant and lubricant at some point within the compression refrigeration system, such that separation into distinct phases is effected. Consequently, the lubricant and refrigerant need to be selected such that immiscibility is present. A miscible solution of refrigerant and lubricant is to be avoided. Further, in order for the lubricant rich phase to be returned to the compressor from a collection point from anywhere within the compression refrigeration system, the lubricant rich phase must reside below the refrigerant rich phase, i.e., the lubricant rich phase must sink to the bottom. This collection point may vary depending upon the size and application of the refrigeration unit, e.g., freezer units, refrigerator units, automotive air conditioners, etc.

The collection point is also determined by the lubricant/refrigerant pair. Usually when there is some degree of solubility of the lubricant/refrigerant pair, it will occur at a higher rather than a lower temperature. Within the compression refrigeration system, the higher temperature occurs near the condenser. The highest degree of insolubility of this lubricant/refrigerant pair then is on the low temperature/low pressure side of the compression refrigeration system which is in proximity to the evaporator. Therefore, the collection point to return the lubricant rich phase back to the compressor will be when the greatest amount of insolubility occurs in that particular lubricant/refrigerant pair which will be near the evaporator.

There are other lubricant/refrigerant pairs that demonstrate inverse solubility in that solubility is greater at a lower temperature and insolubility is greater at a higher temperature. Examples are component (B3), the organic ester of a carboxylic acid and an alcohol. The alcohol is pentaerythritol and the acid is a mixture of 70% isononanoic acid, 15% straight chain acid of eight to ten carbon atoms and 15% of straight chain heptanoic acid. An ester of this composition is Solest 68 available from CPI Engineering Services, Inc., Midland, Michigan. In this instance, the greatest amount of insolubility occurs near the condenser. An illustrative, but non-exhaustive list of refrigerants that give inverse solubility with this ester is R-32, R-125, R-143a, R-236fa, R-245fa, R-404A, R-407C, R-410A and R-507.

In order for the lubricant rich phase to return to the compressor from anywhere in the compression refrigeration system, two conditions must be met. The first condition is to have a great amount of insolubility of the lubricant/refrigerant pair. To determine this, one needs to know if the pair has a normal or inverse solubility relationship. The second condition is for the lubricant rich phase to reside below the refrigerant rich phase, i.e., the lubricant rich phase must sink to the bottom for the purpose of returning the lubricant rich phase back to the compressor.

Depending upon the temperature, the lubricant/refrigerant pair may be of one phase or two phases. When two phases are present, the lubricant rich phase is either below or above the refrigerant rich phase. However, this invention has utility only when the lubricant rich phase resides below the refrigerant rich phase.

For the lubricant/refrigerant pair, generally the lubricant is present at from 0.1–80% by weight of the pair, preferably at from 0.5–50% by weight of the pair and most preferably at from 1–25% by weight of the pair.

For lubricant/refrigerant pairs having inverse solubility, the phase separation such that the lubricant rich phase resides below the refrigerant rich phase, occurs at a temperature of above −60° C., preferably above −20° C. and most preferably above 0° C.

Blends of selected lubricant/refrigerant pairs are prepared in sealed miscibility tubes. The blends are usually prepared at room temperature and then subjected to temperature variations of from −60° C. to 65° C. to determine at what temperature the lubricant rich phase resides on the bottom. As will be noted in the data in Tables I–V below, at low concentrations of the lubricant (Solest-68) in the refrigerant, phase separation does not occur. Each lubricant/refrigerant pair has a minimum concentration of lubricant in order to effect immiscibility. The object of the data in the tables is to determine the lowest temperature (for an inverse solubility system) at which phase separation occurs wherein the lubricant rich phase resides below the refrigerant rich phase. In the below tables, OP=one phase, tp=two phases, tp bottom=two phases wherein the lubricant rich phase resides on the bottom, tp suspended=two phases with a suspension of one phase in the other phase, tp top=two phases wherein the lubricant rich phase resides above the refrigerant rich phase, CL=cloudy, and H=hazy.

TABLE I

| Lubricant concentration = Temperature ° C. | 1.6 | 4.4 | 8.7 | 21.3 |
|---|---|---|---|---|
| 65 | OP | tp bottom | tp bottom | tp bottom |
| 60 | OP | tp bottom | tp bottom | tp bottom |
| 55 | OP | tp bottom | tp bottom | tp bottom |
| 50 | OP | tp bottom | tp bottom | tp bottom |
| 45 | OP | tp bottom | tp bottom | tp bottom |
| 40 | OP | tp bottom | tp bottom | tp bottom |
| 35 | OP | tp bottom | tp bottom | tp bottom |
| 30 | OP | tp bottom | tp bottom | tp bottom |
| 25 | OP | tp bottom | tp bottom | tp bottom |
| 20 | OP | tp suspended | tp bottom | tp bottom |
| 15 | OP | tp suspended | tp bottom | tp bottom |
| 10 | OP | tp suspended | tp bottom | tp bottom |
| 5 | OP | tp suspended | tp suspended | tp top |
| 0 | OP | tp suspended | tp suspended | tp top |

Lubricant = Solest 68
Refrigerant = R-143a

The critical point of the data in the tables is the lowest temperature at which tp bottom is observed. At 4.4% lubricant concentration, that temperature is 25° C.; for 21.3% lubricant concentration, that temperature is 10° C.

TABLE II

| Lubricant concentration = Temperature ° C. | 2.3% | 4.2% | 5.4% | 14.0% | 21.3% | 49.5% |
|---|---|---|---|---|---|---|
| 65 | OP | tp bottom | tp bottom | tp bottom | tp bottom | tp bottom |
| 60 | OP | tp bottom | tp bottom | tp bottom | tp bottom | tp bottom |

TABLE II-continued

| Lubricant concentration = Temperature ° C. | 2.3% | 4.2% | 5.4% | 14.0% | 21.3% | 49.5% |
|---|---|---|---|---|---|---|
| 55 | OP | OP | tp bottom | tp bottom | tp bottom | tp bottom |
| 50 | OP | OP | tp bottom | tp bottom | tp bottom | tp bottom |
| 45 | OP | OP | tp bottom | tp bottom | tp bottom | tp bottom |
| 40 | OP | OP | tp bottom | tp bottom | tp bottom | tp bottom |
| 35 | OP | OP | tp bottom | tp bottom | tp bottom | tp bottom |
| 30 | OP | OP | tp suspended | tp bottom | tp bottom | tp bottom |
| 25 | OP | OP | OP | tp bottom | tp bottom | tp bottom |
| 20 | OP | OP | CL | tp top | tp top | tp bottom |
| 15 | OP | OP | OP | tp top | tp top | tp top |

Lubricant = Solest 68
Refrigerant = R-32

TABLE III

| Lubricant concentration = Temperature ° C. | 0.9% | 2.6% | 3.6% | 8.8% | 15.6% |
|---|---|---|---|---|---|
| 65 | OP | OP | tp bottom | tp bottom | tp bottom |
| 60 | OP | OP | tp bottom | tp bottom | tp bottom |
| 55 | OP | OP | 11 | tp bottom | tp bottom |
| 50 | OP | OP | OP | tp bottom | tp bottom |
| 45 | OP | OP | OP | tp suspended | tp suspended |
| 40 | OP | OP | OP | OP | OP |

Lubricant = Solest 68
Refrigerant = R-125

TABLE IV

| Lubricant concentration = Temperature ° C. | 0.9% | 2.1% | 3.3% | 9.1% | 16.2% | 31.2% |
|---|---|---|---|---|---|---|
| 65 | OP | OP | tp on bottom | tp on bottom | tp bottom | tp bottom |
| 60 | OP | OP | tp on bottom | tp on bottom | tp bottom | tp bottom |
| 55 | OP | OP | tp on bottom | tp on bottom | tp bottom | tp bottom |
| 50 | OP | OP | tp on bottom | tp on bottom | tp bottom | tp bottom |
| 45 | OP | OP | tp on bottom | tp on bottom | tp bottom | tp bottom |
| 40 | OP | OP | OP | tp on bottom | tp bottom | tp bottom |
| 35 | OP | OP | OP | tp suspended | tp bottom | tp suspended |
| 30 | OP | OP | OP | CL | tp bottom | tp suspended |
| 25 | OP | OP | OP | CL | tp top | tp suspended |

Lubricant = Solest 68
Refrigerant = R-507

TABLE V

| Lubricant concentration = Temperature ° C. | 1.5% | 2.7% | 4.7% | 8.9% | 20.0% | 41.5% |
|---|---|---|---|---|---|---|
| 65 | OP | OP | tp on bottom | tp on bottom | tp bottom | tp bottom |
| 60 | OP | OP | tp on bottom | tp on bottom | tp bottom | tp bottom |
| 55 | OP | OP | tp on bottom | tp on bottom | tp bottom | tp bottom |
| 50 | OP | OP | tp bottom | tp on bottom | tp bottom | tp bottom |
| 45 | OP | OP | OP | tp on bottom | tp bottom | tp bottom |
| 40 | OP | OP | OP | tp suspended | tp bottom | tp suspended |
| 35 | OP | OP | OP | CL | tp top | tp on top |

Lubricant = Solest 68
Refrigerant = R-410A

Tables I through V are well-defined studies of Solest 68 lubricant, as component (B3) in various fluorine-only refrigerants. Table VI shows selected lubricants in many of the same fluorine-only refrigerants. The temperature data within Table VI is the lowest temperature at which a lubricant-rich phase resides below a refrigerant-rich phase.

TABLE VI

| Lubricant Type | Component | Product Name | R-32 (1) | R-125 (2) | R-143a (1) |
|---|---|---|---|---|---|
| Alkyl Benzene | B1 | RF-300 | 55° C. | | 40° C. |
| Aromatic Mineral Oil | B8 | XK-37 | 30 | 60° C. | 20 |

TABLE VI-continued

| Lubricant Type | Component | Product Name | R-32 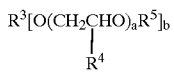 | R-125 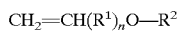 | R-143a 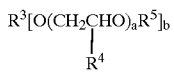 |
|---|---|---|---|---|---|
| NP PAG | B4 | WI-200N | 10 | 40 | −5 |
| Phosphate Ester | B2 | Durad 620B | −45 | 30 | |
| Polyol Ester | B3 | Solest-120 | 20 | 50 | 5 |
| Polyol Ester | B3 | Solest-31-HE | 20 | 60 | 5 |
| Polyol Ester | B3 | BAL 22 CC | 12 | 55 | 0 |
| Polyalphaolefin | B7 | CP-4600-46 | 65 | | 20 |

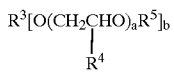 = 20% weight lubricant
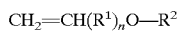 = 10% weight lubricant

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A lubricant-refrigerant composition contained within a compression refrigeration system, wherein said compression refrigeration system comprises a compressor, condenser, evaporator, expansion valve, oil return valve, and oil return line; and said lubricant-refrigerant composition comprises;
   (A) at least one fluorine-containing hydrocarbon refrigerant containing 1 or 2 carbon atoms, further wherein fluorine is the only halogen in said fluorine-containing hydrocarbon; and
   (B) at least one lubricant comprising
      (1) a hydrocarbyl substituted arene,
      (2) a phosphate ester,
      (3) an organic ester of a carboxylic acid and an alcohol,
      (4) a perfluoropolyethylene,
      (5) an ether of the structure $$R^3[O(CH_2CHO)_aR^5]_b$$
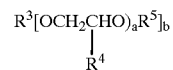

wherein $R^3$ is a hydrocarbon group containing from 1 to 20 carbon atoms, $R^4$ is independently hydrogen, methyl or ethyl, $R^5$ is hydrogen or an aliphatic group, b is an integer of from 1 to 10 and a, when a≠0, is an integer such that the product of a and b is at least two;
      (6) a polyether wherein the polyether is prepared by polymerizing an ether of the structure $$CH_2=CH(R^1)_nO-R^2$$

wherein $R^1$ is a methylene group, n is 0, 1 or 2 and $R^2$ is an aliphatic group containing from 1 to 4 carbon atoms, or
      (7) a polyalphaolefin;
wherein at a temperature of above −60° C. that a phase separation occurs such that at least two phases are formed, said phases being a refrigerant rich phase and a lubricant rich phase, further wherein the lubricant rich phase resides below the refrigerant rich phase.

2. The composition of claim 1 wherein the oil return line is connected to the compressor wherein the compressor is a screw compressor, a rotary compressor, a reciprocation compressor, a scroll compressor or a centrifugal compressor.

3. The composition of claim 2 wherein the compressor is an external drive compressor, semi-hermetic or hermetic compressor.

4. A method of separating a lubricant-refrigerant composition and returning a lubricant rich phase of the lubricant from a refrigerant rich phase of the refrigerant to a compressor, which comprises;
   permitting a liquid phase separation between the lubricant rich phase and the refrigerant rich phase wherein at a temperature of above −60° C. the lubricant rich phase resides below the refrigerant rich phase;
   removing the lower layer lubricant rich phase away from the upper layer refrigerant rich phase, and
   returning the lubricant rich phase to the compressor;
   wherein the refrigerant and lubricant comprise
      (A) at least one fluorine-containing hydrocarbon refrigerant containing 1 to 3 carbon atoms, further where fluorine is the only halogen in said fluorine-containing hydrocarbon with the proviso that 1,1,1, 2-tetrafluoroethane is not the sole refrigerant; and
      (B) at least one lubricant comprising
         (1) a hydrocarbyl substituted arene,
         (2) a phosphate ester,
         (3) an organic ester of a carboxylic acid and an alcohol,
         (4) a perfluoropolyethylene,
         (5) an ether of the structure $$R^3[OCH_2CHO)_aR^5]_b$$

wherein $R^3$ is hydrogen, a hydrocarbon group containing from 1 to 20 carbon atoms, or an alkyl substituted aromatic wherein the alkyl group contains from 1 to 12 carbon atoms, $R^4$ is independently hydrogen, methyl or ethyl, $R^5$ is acyl group containing from 2 to 20 carbon atoms, b is an integer of from 1 to 10 and a is an integer such that the product of a and b is at least two;
         (6) a polyether wherein the polyether is prepared by polymerizing an ether of the structure $$CH_2=CHR^1O-R^2$$

wherein $R^1$ is hydrogen or an alkyl group containing from 1 to 4 carbon atoms and $R^2$ is an aliphatic group containing from 1 to 8 carbon atoms,
         (7) a polyalphaolefin; or
         (8) a mineral oil.

5. A compression refrigeration system, comprising;
   a compressor, a condenser, an oil return valve, an oil return line, an expansion valve and an evaporator wherein the system is charged with a composition comprising
      (A) at least one fluorine-containing hydrocarbon refrigerant containing 1 to 3 carbon atoms, further wherein fluorine is the only halogen in said fluorine-containing hydrocarbon with the proviso that 1,1,1, 2-tetrafluoroethane is not the sole refrigerant; and
      (B) at least one lubricant comprising
         (1) a hydrocarbyl substituted arene,
         (2) a phosphate ester,
         (3) an organic ester of a carboxylic acid and an alcohol,
         (4) a perfluoropolyethylene, (5) an ether of the structure

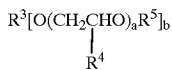

wherein $R^3$ is hydrogen, a hydrocarbon group containing from 1 to 20 carbon atoms, or an alkyl substituted aromatic wherein the alkyl group contains from 1 to 12 carbon atoms, $R^4$ is independently hydrogen, methyl or ethyl, $R^5$ is hydrogen or a hydrocarbon group containing from 1 to 20 carbon atoms or an acyl group containing from 2 to 20 carbon atoms, b is an integer of from 1 to 10 and a is an integer such that the product of a and b is at least two;

(6) a polyether wherein the polyether is prepared by polymerizing an ether of the structure

wherein $R^1$ is hydrogen or an alkyl group containing from 1 to 4 carbon atoms and $R^2$ is an aliphatic group containing from 1 to 8 carbon atoms, (7) a polyalphaolefin; or (8) a mineral oil;

wherein at a temperature of above −60° C. a phase separation occurs such that at least two phases are formed, said phases being a refrigerant rich phase and a lubricant rich phase, further wherein the lubricant rich phase resides below the refrigerant rich phase, such that the lubricant rich phase is separated from the refrigerant rich phase by the oil return valve and the lubricant rich phase returned to the compressor by the oil return line.

6. The composition of claim 5 wherein the oil return line is connected to the compressor wherein the compressor is a screw compressor, a rotary compressor, a reciprocating compressor, a scroll compressor or a centrifugal compressor.

* * * * *